(12) United States Patent
Chen et al.

(10) Patent No.: US 11,874,371 B2
(45) Date of Patent: Jan. 16, 2024

(54) SPARSE OPTIMIZATION METHOD BASED ON CROSS-SHAPED THREE-DIMENSIONAL IMAGING SONAR ARRAY

(71) Applicant: ZHEJIANG UNIVERSITY, Hangzhou (CN)

(72) Inventors: Yaowu Chen, Hangzhou (CN); Xuesong Liu, Hangzhou (CN); Fan Zhou, Hangzhou (CN); Rongxin Jiang, Hangzhou (CN); Dongdong Zhao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 544 days.

(21) Appl. No.: 17/056,759

(22) PCT Filed: Oct. 22, 2018

(86) PCT No.: PCT/CN2018/111157
§ 371 (c)(1),
(2) Date: Nov. 18, 2020

(87) PCT Pub. No.: WO2019/237621
PCT Pub. Date: Dec. 19, 2019

(65) Prior Publication Data
US 2021/0190946 A1    Jun. 24, 2021

(30) Foreign Application Priority Data

Jun. 14, 2018 (CN) .......................... 201810613355.6

(51) Int. Cl.
*G01S 15/89* (2006.01)
*G01S 7/526* (2006.01)
(52) U.S. Cl.
CPC .......... *G01S 15/8915* (2013.01); *G01S 7/526* (2013.01); *G01S 15/8968* (2013.01)

(58) Field of Classification Search
None
See application file for complete search history.

(56) References Cited

U.S. PATENT DOCUMENTS

2013/0128702 A1* 5/2013 Degertekin ......... G01S 15/8913
367/140

FOREIGN PATENT DOCUMENTS

| CN | 101625408 A | * | 1/2010 | |
| CN | 108828603 A | * | 11/2018 | ............. G01S 15/89 |

OTHER PUBLICATIONS

Trucco, Andrea. "Thinning and weighting of large planar arrays by simulated annealing." IEEE transactions on ultrasonics, ferroelectrics, and frequency control 46.2 (1999): 347-355. (Year: 1999).*

(Continued)

*Primary Examiner* — Isam A Alsomiri
*Assistant Examiner* — Jonathan D Armstrong
(74) *Attorney, Agent, or Firm* — Jiwen Chen; Joywin IP Law PLLC

(57) ABSTRACT

The present invention a sparse optimization method based on cross-shaped three-dimensional imaging sonar array, comprising the following steps: first, constructing a beam pattern simultaneously applicable to a near field and a far field based on a cross-shaped array; then, constructing an energy function required by sparse optimization according to the beam pattern; then, introducing an array element position disturbance into a simulated annealing algorithm to increase the degree of freedom of the sparse process and increase the sparse rate of the sparse array, and using the simulated annealing algorithm to sparse optimization of the energy function; finally, after optimization, a sparse optimization cross-shaped array is obtained. The present invention ensures that the three-dimensional imaging sonar system has the desired performance at any distance, and greatly reduces (Continued)

the hardware complexity of the system. It provides an effective method to achieve high performance and ultra-low complexity 3D imaging sonar system.

6 Claims, 3 Drawing Sheets

(56) References Cited

OTHER PUBLICATIONS

Trucco, Andrea, Maria Palmese, and Stefania Repetto. "Devising an affordable sonar system for underwater 3-D vision." IEEE transactions on instrumentation and measurement 57.10 (2008): 2348-2354. (Year: 2008).*

Chen, Peng, et al. "Optimized simulated annealing algorithm for thinning and weighting large planar arrays." Journal of Zhejiang University Science C 11.4 (2010): 261-269. (Year: 2010).*

* cited by examiner

SPARSE OPTIMIZATION METHOD BASED ON CROSS-SHAPED THREE-DIMENSIONAL IMAGING SONAR ARRAY

This is a U.S. national stage application of PCT Application No. PCT/CN2018/111157 under 35 U.S.C. 371, filed Oct. 22, 2018 in Chinese, claiming priority of Chinese Application No. 201810613355.6, filed Jun. 14, 2018, all of which is hereby incorporated by reference.

TECHNICAL FIELD

The present invention relates to a phased array three-dimensional (3D) imaging sonar technology field, and particularly relates to a sparse optimization method based on cross-shaped three-dimensional imaging sonar array.

BACKGROUND TECHNOLOGY

Using planar arrays to achieve three-dimensional sonar imaging has the characteristics of long observation distance and high resolution. However, the use of planar arrays is often accompanied by a large number of array elements, and the number of tens of thousands of transducers at every turn results in a planar array 3D acoustic imaging sonar system that is bulky, heavy in equipment, expensive in cost, and huge in power consumption. The planar array three-dimensional acoustic camera sonar system is mainly used on large ships or towed bodies, and can effectively detect waters with relatively simple environments. However, for certain complex environments, divers or small AUVs (autonomous underwater vehicles) are required to flexibly detect through the miniaturized portable three-dimensional acoustic camera sonar system. For such applications, the planar array three-dimensional acoustic camera sonar system is difficult to perform.

In order to solve the huge number of planar array elements and develop a miniaturized three-dimensional acoustic imaging sonar system, many domestic and foreign scientists have proposed solutions from different angles. Among them, a large number of scholars have solved the problem of the huge number of transducers by using unequal-spaced sparse arrays, and proposed random sparse algorithms such as simulated annealing algorithm, genetic algorithm and particle swarm optimization algorithm to obtain the plane receiving array with high sparse rate. But the usually obtained non-equal spaced sparse array still contains about 400 array elements. For miniaturized portable three-dimensional sonar imaging systems, the number of array elements is still high.

Another group of scholars uses the beam forming method of the transmitting array and the receiving array element together, using the beam directivity of the transmitting and receiving beams in different directions to eliminate the redundant array elements in the transmitting and receive arrays, and realize a substantial reduction in the number of redundant array elements. A typical application is a cross-shaped array, which is composed of two mutually perpendicular linear arrays, one as a transmitting array and the other as a receiving array. The transmitting array emits fan beams in the vertical direction and the receiving array detects sonar echoes. And the horizontal beam is formed in the fan beam, and the three-dimensional image is constructed by transmitting and receiving common beam forming.

The cross-shaped array can use M+N array elements to obtain the same beam performance (angle resolution, sidelobe peaks, etc.) as the planar array M×N array elements.

However, there is room for further optimization of the cross-shaped array in terms of the number of array elements and the performance of the entire observation field.

SUMMARY OF THE INVENTION

The object of the present invention is to provide a sparse optimization method based on cross-shaped three-dimensional imaging sonar array. The cross-shaped array designed by the method ensures that the three-dimensional imaging sonar system has the desired performance at any distance, and greatly reduces the hardware complexity of the system. It provides an effective method to achieve high performance and ultra-low complexity 3D imaging sonar system.

To achieve the above objects, the present invention provides the following technical solutions:

A sparse optimization method based on cross-shaped three-dimensional imaging sonar array, comprising the following steps:

(1) constructing a beam pattern $BP(W,u,v,\delta,f_j)$ simultaneously applicable to a near field and a far field based on a cross-shaped array, the beam pattern $BP(W,u,v,\delta,f_j)$ is $$BP(W, u, v, \delta, f_j) = \left| \sum_{n=0}^{N-1} \omega_n \cdot \exp\left[-j\frac{2\pi f_j}{c} y_n \cdot v + \delta \frac{y_n^2}{2}\right] \right| \times \left| \sum_{m=1}^{M} \omega_m \exp\left[-j\frac{2\pi f_j}{c} x_m \cdot u + \delta \frac{x_m^2}{2}\right] \right|$$

wherein, W is the weight coefficient of the array, including a weight coefficient $\omega_n$ of the vertical transmitting array and a weight coefficient $\omega_m$ of the horizontal receiving array;

$f_j$ is the transmitting frequency in the vertical beam j direction;

$x_m$ is the position of the m-th element of the horizontal receiving array;

y is the position of the nth element of the vertical transmitting array;

c is the speed at which sound waves propagate in water;

$\delta = 1/r - 1/r_0$;

r is the target distance;

$r_0$ is the beam focusing distance;

$u = \sin \beta_a - \sin \theta_a$;

$v = \sin \beta_e - \sin \theta_e$;

$\beta_a$ is the horizontal beam arrival direction;

$\theta_a$ is the horizontal beam focusing direction;

$\beta_e$ is the vertical beam arrival direction;

$\theta_e$ is the vertical beam focusing direction;

when $\delta=0$, BP is a far field beam pattern; when $\delta \neq 0$, BP is a near field beam pattern;

(2) constructing an energy function E(W,A) required by sparse optimization according to the beam pattern, the energy function E(W,A) is:

$$E(W, A) = k_1 \left( \int_{\delta_{min}}^{\delta_{max}} \left( \sum_{(u,v)\in \Omega} \left( \frac{BP(W, \delta, u, v, f_j)}{BP_{MAX}} - b_d \right) \right) d\delta \right)^2 + k_2 A^2 + k_3 (R_o - R_d)^2$$

Wherein, $k_1$, $k_2$ and $k_3$ are the weight coefficients of the corresponding items; $b_d$ is the desired beam pattern sidelobe peak; $R_d$ is the ratio of the maximum weight coefficient to the minimum weight coefficient in the weight coefficient matrix W; $R_d$ is the ratio of the desired maximum weight coefficient to the minimum weight coefficient; the value range $\Omega$ of u and v corresponds to the part of the sidelobe beam whose intensity is greater than $b_d$; $\delta_{min}$ and $\delta_{max}$ represent the minimum and maximum values of S respectively;

(3) introducing an array element position disturbance into a simulated annealing algorithm, and using the simulated annealing algorithm to sparse optimization of the energy function E(W,A);

(4) after step (3) optimization, a sparse optimization cross-shaped array is obtained.

Wherein, the introduction of an array element position disturbance into the simulated annealing algorithm includes:

a. if the selected array element weight coefficient is not 0, that is, the selected array is in the on state, the array element weight coefficient and the current array element position $p_{xy}=(x_m, y_n)$ are cached ($\omega_{temp}$);

b. closing the array element, updating the array element weight coefficient matrix W and the number of array elements A, and calculating the energy function;

c. when the energy function decreases, accepting the state and selecting the next random array element;

d. when the energy function increases, turning on the array element again, and the weight coefficient adds a random disturbance within a certain range, and a disturbance is added to the original position $p_{xy}$ of the array element at the same time.

The beneficial effects of the present invention are: the sparse optimization method of the cross-shaped three-dimensional imaging sonar array provided by the present invention can design the two-dimensional sparse cross-shaped array of the phased array three-dimensional imaging sonar system. The cross-shaped array can effectively reduce the hardware complexity of the system at the same time, and ensure that the system has stable detection performance at different detection distances.

BRIEF DESCRIPTION OF THE DRAWINGS

In order to explain the embodiments of the present invention or the technical solutions in the prior art more clearly, the following will briefly introduce the drawings that need to be used in the description of the embodiments or the prior art. Obviously, the drawings in the following description are only some embodiments of the present invention. For those of ordinary skill in the art, other drawings may be obtained from these drawings without creative work.

DETAILED DESCRIPTION OF THE INVENTION

In order to make the objectives, technical solutions, and advantages of the present invention clearer, the following further describes the present invention in detail with reference to the accompanying drawings and embodiments. It should be understood that the specific embodiments described herein are only used to explain the present invention, and do not limit the protection scope of the present invention.

In this embodiment, the initial array is a 100-element vertical transmitting array and a 100-element horizontal receiving array. The transducers are evenly distributed in a rectangular plane at half-wavelength spacing. The horizontal spacing and vertical spacing of the transducers are equal. The transmitting frequency $f_j$ is 205 kHz-300 kHz, and the step is 5 kHz, and the sound velocity is c=1500 m/s.

Figure 1:
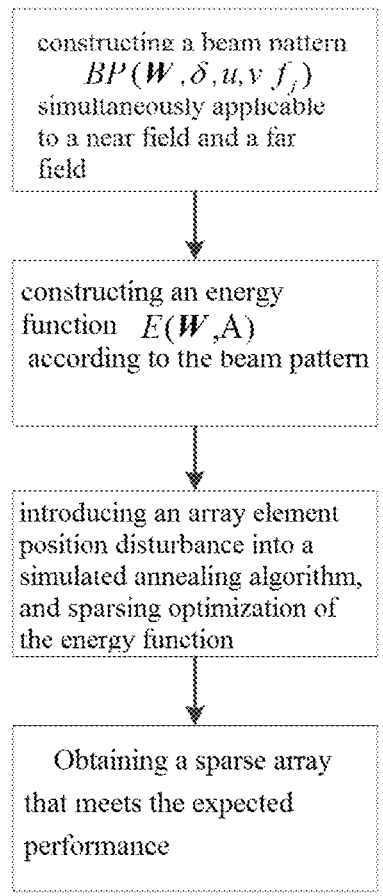
FIG. 1 is a flowchart of the array sparse optimization process of the present invention.

As shown in FIG. 1, the sparse optimization method based on cross-shaped three-dimensional imaging sonar array provided by this embodiment comprises the following steps:

S101, based on the multi-frequency transmission algorithm and the cross-shaped array, a beam pattern BP(W, u,v,δ,$f_j$) simultaneously applicable to a near field and afar field is provided, the beam pattern BP(W,u,v,δ,$f_j$) is:

$$BP(W, u, v, \delta, f_j) = \left| \sum_{n=0}^{N-1} \omega_n \cdot \exp\left[-j\frac{2\pi f_j}{c} y_n \cdot v + \delta \frac{y_n^2}{2}\right] \right| \times \left| \sum_{m=1}^{M} \omega_m \exp\left[-j\frac{2\pi f_j}{c} x_m \cdot u + \delta \frac{x_m^2}{2}\right] \right|$$

wherein, W is the weight coefficient of the array, including a weight coefficient $\omega_n$ of the vertical transmitting array and a weight coefficient $\omega_m$ of the horizontal receiving array;

$f_j$ is the transmitting frequency 205 kHz-300 kHz in the vertical beam j direction, and the step is 5 kHz, j=1, 2, . . . , 20;

$x_m$ is the position of the m-th element of the horizontal receiving array, $x_m = m\lambda_{min}/2$, m=1, 2, . . . , 100; $\lambda_{min}$ is the wavelength corresponding to the highest frequency among all emitted sound waves.

$y_n$ is the position of the n-th element of the vertical transmitting array, $y_n = n\lambda_{min}/2$, n=1, 2, . . . , 100;

c is the speed at which sound waves propagate in water 1500 m/s;

$\delta = 1/r - 1/r_0$;

r is the target distance, detecting a target within 50 meters;

$r_0$ is the beam focusing distance, the focusing range is 50 meters;

$u = \sin\beta_a - \sin\theta_a$, the value range $u \in [0,1]$;

$v = \sin\beta_e - \sin\theta_e$, the value range $v \in [0,1]$;

$\beta_a$ is the horizontal beam arrival direction, the viewing angle range is 60°;

$\theta_a$ is the horizontal beam focusing direction, the viewing angle range is 60°;

$\beta_e$ is the vertical beam arrival direction, the viewing angle range is 60°;

$\theta_e$ is the vertical beam focusing direction, the viewing angle range is 60°;

S102, an energy function E(W,A) required by sparse optimization according to the beam pattern BP(W,u,v,δ,f$_j$) is constructed.

Figure 2:
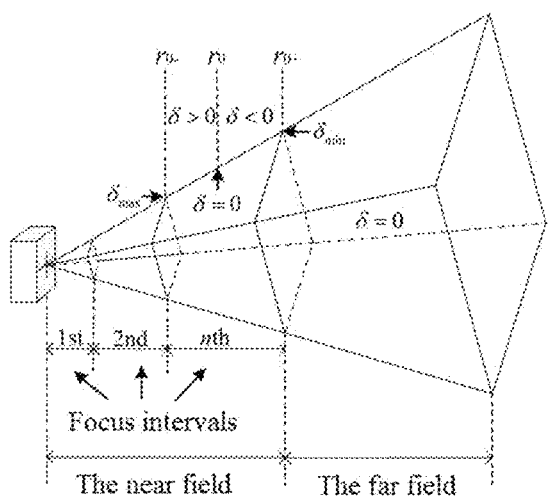
FIG. 2 is a schematic diagram of dividing the far field and near field focusing intervals of the present invention.

As shown in FIG. 2, the entire observation scene is divided into two parts, the near field and the far field; when δ=0, BP(W,u,v,δ,f$_j$) is a far field beam pattern; when δ≠0, BP(W,u,v,δ,f$_j$) is a near field beam pattern.

The near field is composed of multiple focus intervals, and each focus interval selects a beam focus distance r$_0$, then the boundaries of the focus interval are r$_{0-}$ and r$_{0+}$, that is, the Depth of Field (DOF) is [r$_{0-}$,r$_{0+}$]. r$_{0-}$ corresponds to $\delta_{max}$, r$_{0+}$ corresponds to $\delta_{min}$.

In the depth of field, the main lobe attenuation is less than 3 dB. An energy function E(W,A) required by sparse optimization according to the beam pattern is constructed, the energy function E(W,A) is:

$$E(W, A) = k_1 \left( \int_{\delta_{min}}^{\delta_{max}} \left( \sum_{(u,v) \in \Omega} \left( \frac{BP(W, \delta, u, v, f_j)}{BP_{MAX}} - b_d \right) \right)^2 d\delta \right) + k_2 A^2 + k_3 (R_o - R_d)^2$$

wherein, $k_1$, $k_2$ and $k_3$ are the weight coefficients of the corresponding items, setting $k_1$=10000, $k_2$=20000, $k_3$=1; $b_d$ is the desired beam pattern sidelobe peak, $b_d$ is -22 dB; Ro is the ratio of the maximum weight coefficient to the minimum weight coefficient in the weight coefficient matrix W; $R_d$ is the ratio of the desired maximum weight coefficient to the minimum weight coefficient, $R_d$ is 3; the value range Ω of u and v corresponds to the part of the sidelobe beam whose intensity is greater than $b_d$; $\delta_{min}$ and $\delta_{max}$ represent the minimum and maximum values of δ respectively; the calculation formula of $\delta_{min}$ and $\delta_{max}$ is:

$$\delta_{min} = -\frac{2\lambda_{min}}{D^2}$$

$$\delta_{max} = \frac{2\lambda_{min}}{D^2}$$

wherein, $\lambda_{min}$ is the wavelength corresponding to the highest frequency among all emitted sound waves, $\lambda_{min}$ is 2.5 mm; D is the array aperture, D is 25 cm.

S103, introducing an array element position disturbance into a simulated annealing algorithm, and using the simulated annealing algorithm to sparse optimization of the energy function E(W,A).

Figure 3:
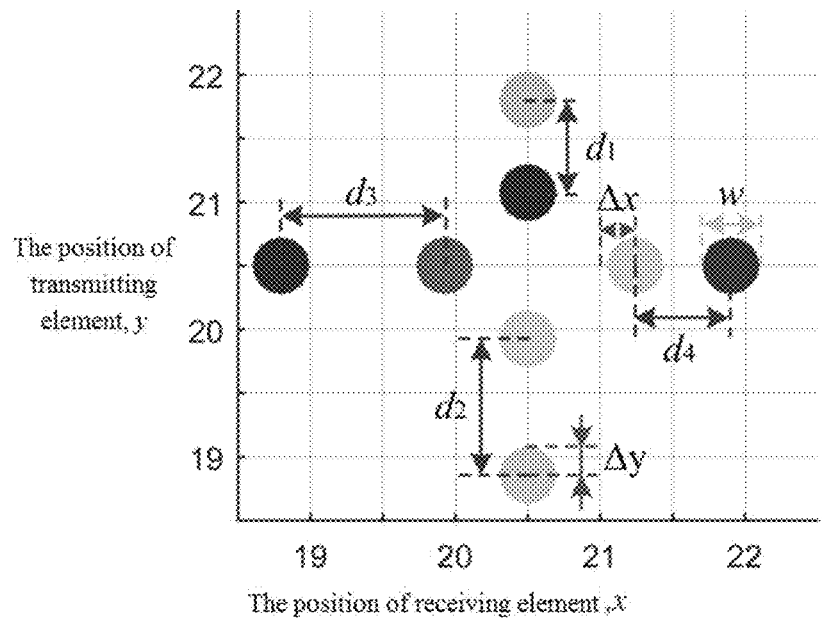
FIG. 3 is a schematic diagram of array disturbance in the sparse optimization process of the present invention.

An array element position disturbance is introduced into the simulated annealing algorithm to increase the degree of freedom of the sparse process and increase the sparse rate of the sparse array. As shown in FIG. 3, the distance between the array elements is $d_i$(i=1, 2, . . . 100), and the array elements deviate from their original positions due to position disturbances. The horizontal and vertical deviation distances are Δx and Δy respectively. Specifically, the formula for adding disturbance is:

a. if the selected array element weight coefficient is not 0, that is, the selected array is in the on state, the array element weight coefficient and the current array element position $p_{xy}$=($x_m$, $y_n$) are cached ($\omega_{temp}$).

b. closing the array element, updating the array element weight coefficient matrix W and the number of array elements A, and calculating the energy function.

c. when the energy function decreases, accepting the state and selecting the next random array element.

d. when the energy function increases, turning on the array element again, and the weight coefficient adds a random disturbance within a certain range, and a disturbance is added to the original position $p_{xy}$ of the array element at the same time. the formula for adding disturbance is:

$$(x_m, y_n) = \begin{cases} p_{xy} + (unifrnd(-0.1 \times \lambda_{min}, 0.1 \times \lambda_{min}), 0), & \text{if receiving array} \\ p_{xy} + (unifrnd(-0.1 \times \lambda_{min}, 0.1 \times \lambda_{min})), & \text{if transmitting array} \end{cases}$$

wherein, unifrnd(-0.1×$\lambda_{min}$, 0.1×$\lambda_{min}$) is a function of the software MATLAB, which means that a random number is generated in the interval (-0.1×$\lambda_{min}$, 0.1×$\lambda_{min}$).

Figure 4:
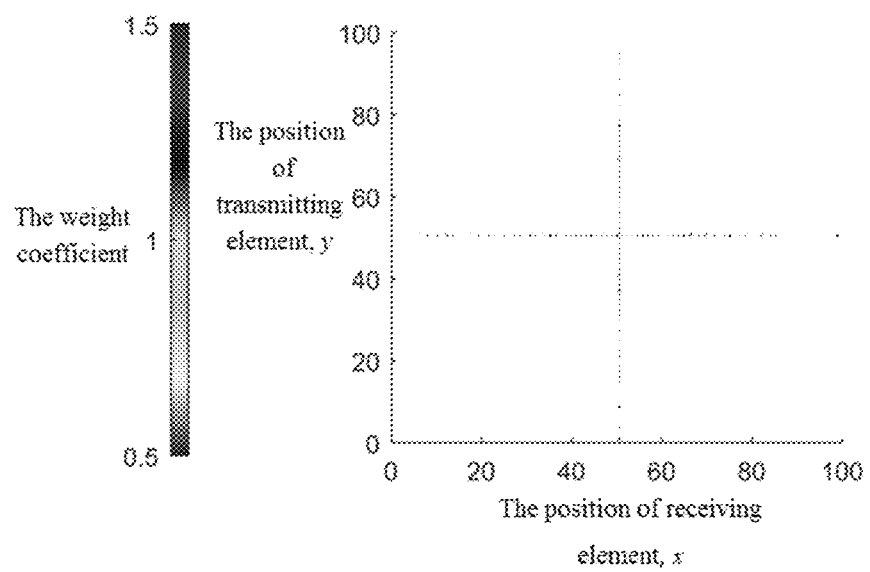
FIG. 4 is a schematic diagram of the sparse cross-shaped array of the present invention.
Figure 5:
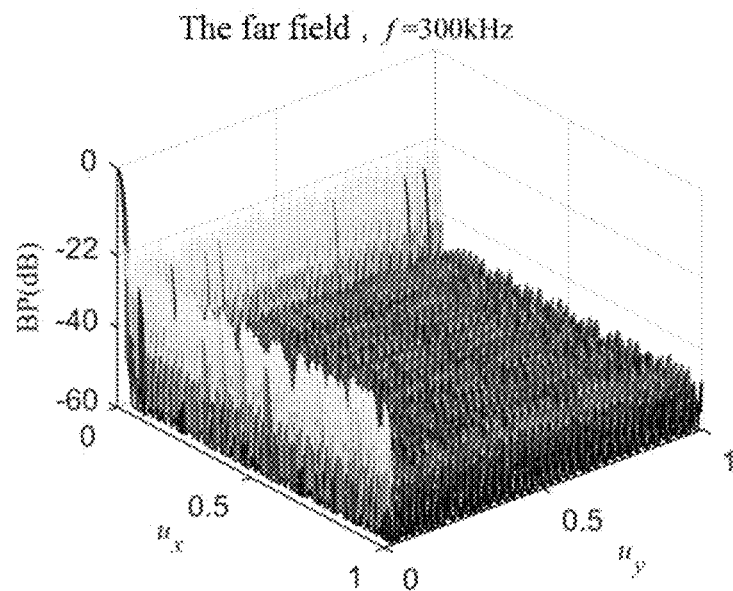
FIG. 5 is a near field beam pattern of the obtained cross-shaped array of the present invention.
Figure 6:
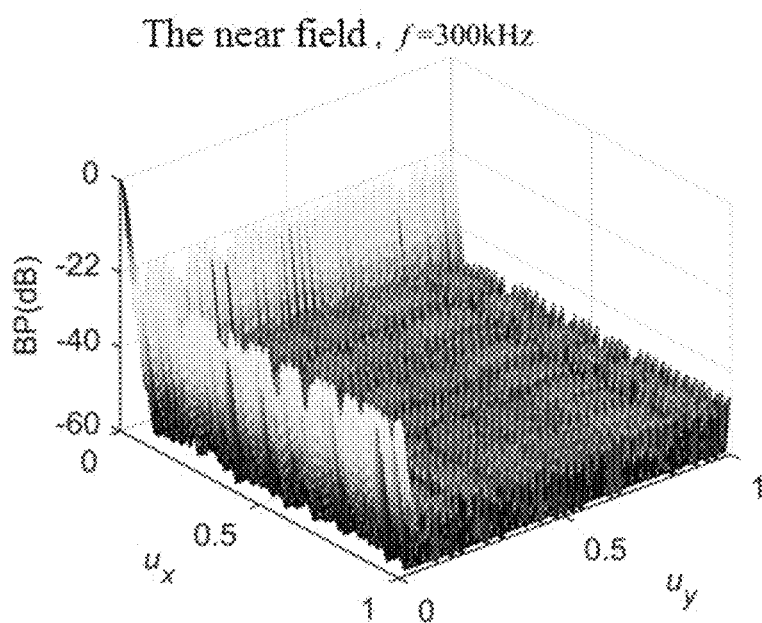
FIG. 6 is a far field beam pattern of the obtained cross-shaped array of the present invention.

S104, after S103 optimization, a sparse optimization cross-shaped array can be obtained, the number of array elements is 120, and the weight coefficient is between 0.5 and 1.5, as shown in FIG. 4. In addition, the beam pattern of the obtained array in the near field is shown in FIG. 5, and the sidelobe is suppressed at -22 dB; the beam pattern in the far field is shown in FIG. 6, and the sidelobe is also suppressed at -22 dB.

A cross-shaped array that satisfies the three-dimensional imaging sonar system with desired performance at any distance can be constructed by using the sparse optimization method of the cross-shaped three-dimensional imaging sonar array provided by this embodiment.

The specific implementations described above describe the technical solutions and beneficial effects of the present invention in detail. It should be understood that the above descriptions are only the most preferred embodiments of the present invention and are not intended to limit the present invention. Any modifications, additions, and equivalent replacements within the scope shall be included in the protection scope of the present invention.

The invention claimed is:

1. A sparse optimization method based on cross-shaped three-dimensional imaging sonar array, comprising the following steps:

constructing a beam pattern BP(W,u,v,δ,f$_j$) simultaneously applicable to a near field and a far field based on a cross-shaped array, the beam pattern BP(W,u,v,δ,f$_j$) being:

$$BP(W, u, v, \delta, f_j) = \left| \sum_{n=0}^{N-1} \omega_n \cdot \exp\left[-j\frac{2\pi f_j}{c} y_n \cdot v + \delta \frac{y_n^2}{2}\right] \right| \times \left| \sum_{m=1}^{M} \omega_m \exp\left[-j\frac{2\pi f_j}{c} x_m \cdot u + \delta \frac{x_m^2}{2}\right] \right|$$

wherein, W is a weight coefficient of the array, including a weight coefficient $\omega_n$ of a vertical transmitting array and a weight coefficient $\omega_m$ of a horizontal receiving array;

$f_j$ is a transmitting frequency of a vertical beam in j direction;

$x_m$ is a position of the m-th element of the horizontal receiving array;
$y_n$ is a position of the nth element of the vertical transmitting array;
c is a speed at which sound waves propagate in water;

$\delta = 1/r - 1/r_0$;

r is a target distance;
$r_0$ is a beam focusing distance;

$u = \sin \beta_a - \sin \theta_a$;

$v = \sin \beta_e - \sin \theta_e$;

$\beta_a$ is a horizontal beam-arrival direction;
$\theta_a$ is a horizontal beam-focusing direction;
$\beta_e$ is a vertical beam-arrival direction;
$\theta_e$ is a vertical beam-focusing direction;
when $\delta = 0$, BP is a far field beam pattern; when $\delta \neq 0$, BP is a near field beam pattern;
constructing an energy function E(W,A) required by sparse optimization according to the beam pattern BP(W,u,v,$\delta$,$f_j$), the energy function E(W,A) being:

$$E(W, A) = k_1 \left( \int_{\delta min}^{\delta max} \left( \sum_{(u,v) \in \Omega} \left( \frac{BP(W, \delta, u, v, f_j)}{BP_{MAX}} - b_d \right) \right) d\delta \right)^2 + k_2 A^2 + k_3 (R_o - R_d)^2$$

wherein, $k_1$, $k_2$ and $k_3$ are the weight coefficients of the corresponding items; $b_d$ is the desired beam pattern sidelobe peak; $R_d$ is the ratio of the maximum weight coefficient to the minimum weight coefficient in the weight coefficient matrix W; Ro is the ratio of the desired maximum weight coefficient to the minimum weight coefficient; the value range $\Omega$ of u and v corresponds to the part of the sidelobe beam whose intensity is greater than $b_d$; $\delta_{min}$ and $\delta_{max}$ represent the minimum and maximum values of S, respectively;
introducing an array element position disturbance into a simulated annealing algorithm, and using the simulated annealing algorithm to sparse optimization of the energy function E(W,A); and
after optimization, obtaining a sparse optimization cross-shaped array.

2. The sparse optimization method based on cross-shaped three-dimensional imaging sonar array according to claim 1, wherein, the introduction of an array element position disturbance into the simulated annealing algorithm comprises:

when the selected array element weight coefficient is not 0, that is, the selected array is in the on state, caching ($\omega_{temp}$) the array element weight coefficient and the current array element position $p_{xy} = (x_m, y_n)$;
closing the array element, updating the array element weight coefficient matrix W and the number of array elements A, and calculating the energy function;
when the energy function decreases, accepting the state and selecting the next random array element; and
when the energy function increases, turning on the array element again, and the weight coefficient adds a random disturbance within a certain range, and a disturbance is added to the original position $p_{xy}$ of the array element at the same time.

3. The sparse optimization method based on cross-shaped three-dimensional imaging sonar array according to claim 2, wherein, in last step, the formula for adding disturbance is:

$$(x_m, y_n) = \begin{cases} p_{xy} + (unifrnd(-0.1 \times \lambda_{min}, 0.1 \times \lambda_{min}), 0), & \text{if receiving array} \\ p_{xy} + (unifrnd(-0.1 \times \lambda_{min}, 0.1 \times \lambda_{min})), & \text{if transmitting array} \end{cases}$$

wherein, unifrnd($-0.1 \times \lambda_{min}, 0.1 \times \lambda_{min}$) is a function of the software MATLAB, which means that a random number is generated in the interval ($-0.1 \times \lambda_{min}, 0.1 \times \lambda_{min}$).

4. The sparse optimization method based on cross-shaped three-dimensional imaging sonar array according to claim 1, wherein, the calculation formula of $\delta_{min}$ and $\delta_{max}$ is:

$$\delta_{min} = -\frac{2\lambda_{min}}{D^2}$$

$$\delta_{max} = \frac{2\lambda_{min}}{D^2}$$

wherein, $\lambda_{min}$ is the wavelength corresponding to the highest frequency among all emitted sound waves; D is the array aperture.

5. The sparse optimization method based on cross-shaped three-dimensional imaging sonar array according to claim 1, wherein, the transmitting frequency of the vertical beam in j direction is 205 kHz~300 kHz, and the step is 5 kHz, j=1, 2, ..., 20.

6. The sparse optimization method based on cross-shaped three-dimensional imaging sonar array according to claim 1, wherein, setting $k_1 = 10000$, $k_2 = 20000$, $k_3 = 1$, $b_d = -22$ dB.

\* \* \* \* \*